United States Patent [19]
Deglan

[11] 3,729,844
[45] May 1, 1973

[54] MULTI-PURPOSE BULLDOZER BLADE

[76] Inventor: Helmut W. Deglan, 20443-70th Avenue, R.R. No. 4, Langley, B.C., Canada

[22] Filed: Mar. 11, 1971

[21] Appl. No.: 123,355

[52] U.S. Cl. ................... 37/117.5, 172/253, 172/801
[51] Int. Cl. ........................... E02f 3/76, A01b 63/00
[58] Field of Search ...................... 172/801, 809, 806, 172/250–253; 37/117.5

[56] References Cited

UNITED STATES PATENTS

| | | | |
|---|---|---|---|
| 2,303,379 | 12/1942 | Mork | 37/117.5 |
| 2,494,225 | 1/1950 | Blake | 172/801 X |
| 3,469,330 | 9/1969 | Hood et al. | 37/117.5 |
| 2,839,849 | 6/1958 | Christensen et al. | 172/806 X |
| 2,732,963 | 1/1956 | Grubich | 172/801 X |
| 3,218,740 | 11/1965 | White | 37/117.5 |
| 2,453,943 | 11/1948 | Smith | 37/117.5 |

*Primary Examiner*—Robert E. Pulfrey
*Assistant Examiner*—Stephen C. Pellegrino
*Attorney*—Fetherstonhaugh & Co.

[57] ABSTRACT

An implement is provided for attachment to the front of an earth moving machine and is supported for rocking movement about a transverse axis and is vertically movable between a substantially ground level position and an elevated position about the machine. The arrangement enables the implement to function as a bulldozer blade, a scraper blade, or a loader bucket. Digging teeth are provided on the implement and a removable plate normally covers the teeth.

3 Claims, 7 Drawing Figures

Patented May 1, 1973 3,729,844

2 Sheets-Sheet 1

INVENTOR
HELMUT W. DEGLAN
BY
Fetherstonhaugh & Co
ATTORNEYS

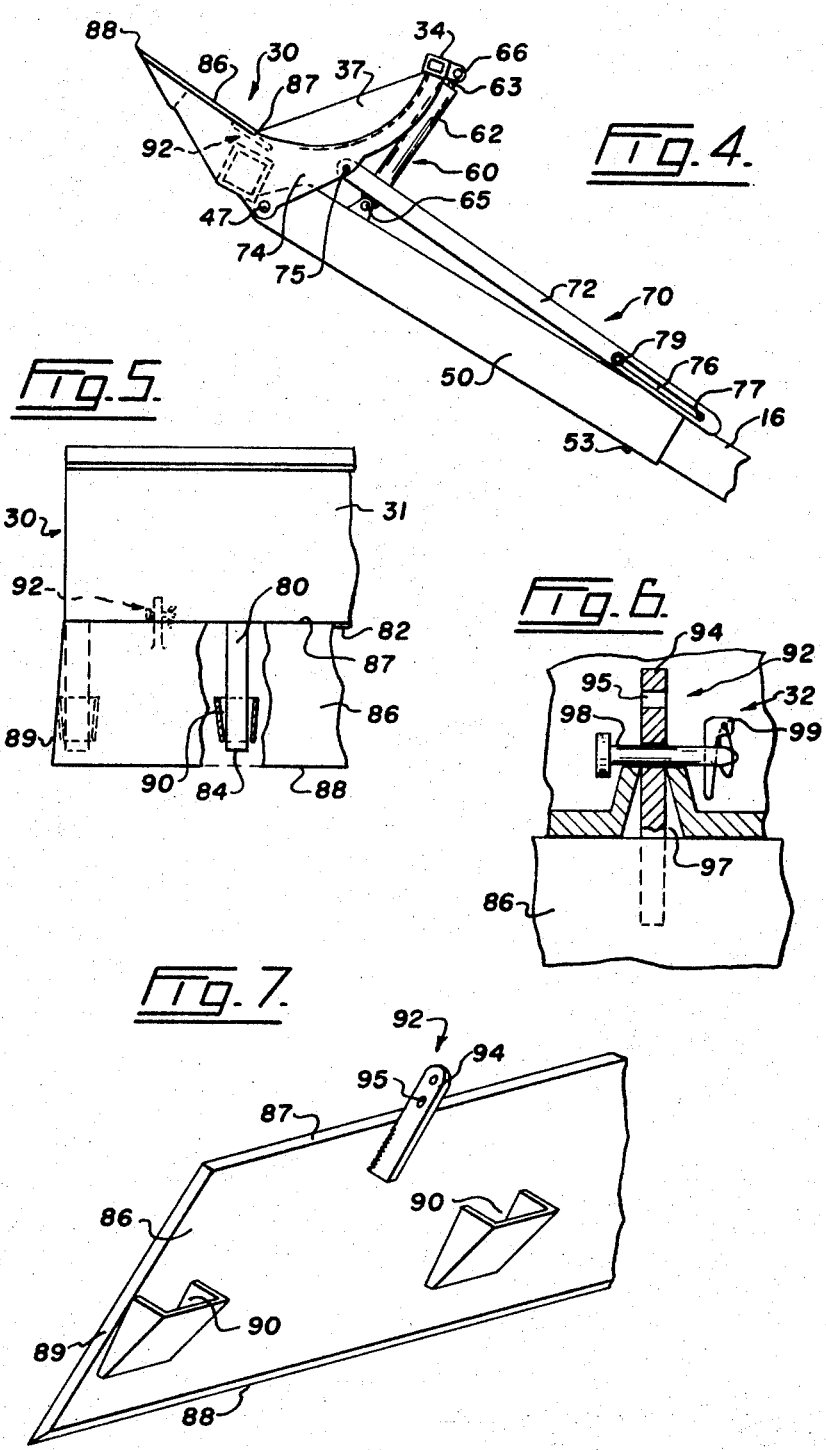

MULTI-PURPOSE BULLDOZER BLADE

My invention relates to an implement which is attachable to a bulldozer to perform a variety of tasks.

A conventional bulldozer blade is designed to move earth and the like by shoving the material ahead of the machine with the lowermost edge of the blade digging into the earth to some extent. The blade does this type of work extremely well but very often conditions are encountered which require the use of a tool of different design. This may mean that the bulldozer has to move out of the way and stand idly by while a machine of appropriate design such as a shovel or a loader is moved up to perform the task which cannot be done with a conventional bulldozer blade. Obviously this employment of several expensive machines with their highly paid operators is an unsatisfactory one which contractors like to avoid if at all possible.

I have solved this particular problem by providing a bulldozer blade which will perform the task for which it was designed as effectively as before but, in addition, can be used as a grading blade or as a loading bucket. The present blade has a portion which is removable to expose the teeth suitable for use in clearing out rocks and roots as well as breaking up hardpan.

Figure 1:
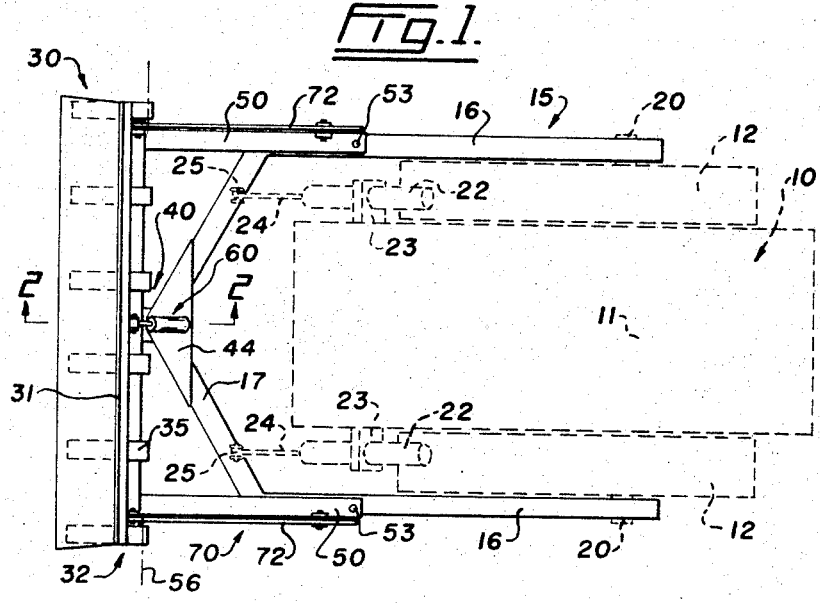
Figure 2:
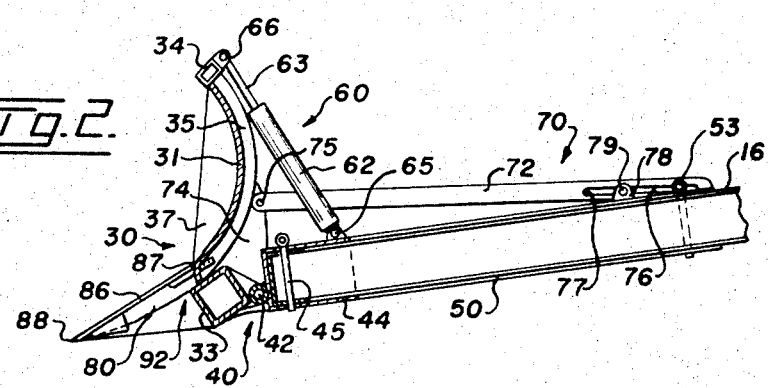
Figure 3:
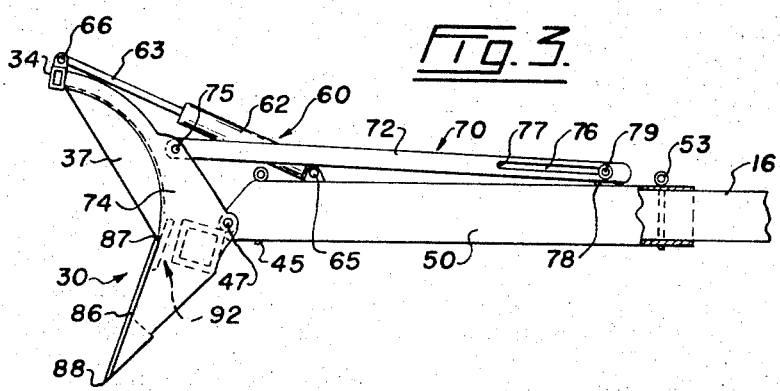

In drawings which illustrate a preferred embodiment of the invention;

FIG. 1 is a plan of a multi-purpose bulldozer blade mounted on a conventional tractor, FIG. 2 is an enlarged vertical section taken on the line 2—2 of FIG. 1, FIG. 3 is a side elevation of the blade in a grading position, FIG. 4 is a side elevation of the blade in a load-carrying position, FIG. 5 is a fragmentary front elevation of the blade supported in a scraping position, FIG. 6 is a detailed view of locking means for securing an extension to the bulldozer blade, and FIG. 7 is a perspective view of a portion of the moldboard extension as seen from the rear.

Referring first to FIG. 1, the numeral 10 indicates generally a bulldozer comprising a tractor 11 which is provided with crawler tracks 12. A C-frame 15, having parallel side members 16 and angularly disposed front member 17 straddles the tractor 11 to project forwardly therefrom. The frame (not shown) of the tractor 11 has laterally projecting trunnions 20 and the rear end of the side members 16 are journalled on these trunnions. Thus, the C-frame 15 is pivotally mounted on the tractor 11 for swinging movement about a transverse axis provided by the trunnions 20 and suitable means is provided for raising and lowering the front end of said frame. For example, the tractor 11 may have vertically swingable hydraulic cylinders 22 mounted on pivot blocks 23 or the like and having piston rods 24 pivotally connected as at 25 to the front members 17. When appropriate ends of the double-acting cylinders 22 are pressurized, the C-frame 15 is raised or lowered with the forward end of said frame moving vertically through an arc. The machine thus far described is of conventional construction and need not be exactly as described and illustrated as long as the front end of the C-frame 15 can be moved vertically in a suitable manner.

The multi-purpose blade which forms the basis of the present invention is generally indicated by the numeral 30. Blade 30 extends across the front members 17 of the C-frame 15 and is provided with a rearwardly curved moldboard 31 which projects beyond the side members 16. A heavy frame 32 is secured to the rear face of the moldboard 31 to give this relatively thin, plate-like member the necessary strength and rigidity and this frame includes transverse bottom and top members 33 and 34 which are connected by vertical ribs 35, see particularly FIGS. 1 and 2. The moldboard 31 is also braced by side plates 37 which are shown in FIGS. 2, 3 and 4. It will be noted that the moldboard 31 and side plates 37 give the bulldozer blade 30 a shape somewhat like a shallow bucket.

Pivot means generally indicated at 40 secures the blade 30 to the C-frame 15. As shown in FIGS. 1 and 2, the pivot means 40 comprises a pin 42 which is suitably mounted so as to connect the bottom member 33 of the moldboard frame with a housing 44. The substantially triangular-shaped housing 44 fits over the apex of the frame members 17 at the forward end of the C-frame 15. The housing 44 is secured to the C-frame 15 simply by means of a removable pin 45, see FIG. 2.

The pivot means 40 also includes two other pivot pins 47 which are aligned with the center pivot pin 42, one near each side edge of the blade 30. For convenience, only one of the side pivot pins 47 is shown in FIGS. 3 and 4. To support the pins 47, each side member 16 of the C-frame is fitted with a side channel 50. Each channel 50 fits over the side member 16 and is secured thereto by a removable pin 53, see FIG. 3 for example. Thus, the center pivot pin 42 and the two side pivot pins 47 secure the blade 30 to the C-frame 15 for rocking movement about a horizontal and transversely extending axis which is indicated by chain dotted line 56 in FIG. 1 only.

The blade 30 is adapted to be rocked about the pivot means 40 by power means generally indicated at 60. Preferably, the means 60 comprises a double-acting hydraulic cylinder 62 fitted with a piston rod 63. The centrally disposed cylinder 62 is pivotally secured as at 65 to the housing 44 as shown best in FIG. 2. Rod 63 is similarly secured as at 66 to the top member 34 of the moldboard frame 32. Cylinder 62 is included in a suitable hydraulic circuit (not shown) extending to the hydraulic system of the tractor 11 whereby the driver of the machine can rock the blade 30 as required about the axis 56 and thus control the operating angle of said blade. The blade 30 has three major operating positions which are the generally upright, ground level position shown in FIG. 2, the forwardly tilted, ground-level position shown in FIG. 3, and the raised and rearwardly tilted position shown in FIG. 4.

In order to relieve the strain of the power means 60 and associated parts when the blade 30 is in either the forwardly or rearwardly tilted positions, the present device includes stop means generally indicated at 70. As shown in FIG. 1, and in greater detail in FIG. 3 for example, the means 70 comprises a pair of arms 72 with one arm being disposed above each side channel 50. The front end of each arm 72 is connected to a bracket 74 on the moldboard frame 32 by a pivot pin 75 and the opposite end of said arm is provided with a longitudinal slot 76 having end edges 77. A bracket 78 is mounted on each side channel 50 near the rear end thereof and this bracket carries a laterally projecting pin 79 which slidably projects through a slot 76 in an adjacent arm. When the blade 30 is in the forwardly tilted position shown in FIG. 3, the two pins 79 are engaged by the rear end edges 77 of the slots 76 whereupon the blade 30 is partly supported by the pair of arms 72. In the same manner, the arms 72 partly support the blade when it is tilted rearwardly as in FIG. 4, the pin 79 at this time engaging the front end edges 77 of the slots 76.

Referring now to FIG. 5, the blade 30 will be seen to be provided with a plurality of digging teeth 80. These transversely spaced teeth 80 are secured to the bottom member 33 of the moldboard frame so as to extend downwardly and forwardly from lower edge 82 of the moldboard. As viewed in side elevation, the teeth 80 will be seen to taper from the member 33 to their outer ends 84.

The moldboard 31 is provided with an extension 86 which is a substantially rectangular plate covering the teeth 80. Extension 86 has an upper edge 87, a lower edge 88, and side edges 89 which preferably diverge from upper 87 to lower edge 88. On the rear face of the moldboard extension 86, a number of transversely spaced holding sockets 90 are formed, see particularly FIGS. 5 and 7, there being one such socket for each tooth 80. The teeth 80 are seated in the holding sockets 90 so that the moldboard extension is firmly held against movement in all directions except longitudinally of the teeth.

To hold the moldboard extension 86 from slipping forwardly off the teeth 80, the multi-purpose blade 30 is provided with locking means generally indicated at 92. As shown in FIG. 5, 6 and 7, the means 92 comprises a pair of bars 94 (one only illustrated) which are welded or otherwise secured to the rear face of the extension 86, one near each side edge thereof. The bars 94 are provided with one or more transversely extending holes 95. The bars 94 each project through a slot 97 (FIG. 6 only) which is formed in the frame 32 to the rear of the moldboard 31. A locking pin 98 is threaded through a suitably spaced hole 95 in each bar 94 to prevent the extension 86 from moving downwardly and forwardly off the teeth 80. Preferably, each locking pin 98 is secured against being accidentally dislodged from its bar 94 by means of a ringed keeper pin 99. Thus, the moldboard extension 86 is firmly locked to the remainder of the blade 30 so that it cannot be dislodged during normal operations.

In operation, the blade 30 is adapted to be positioned as shown in FIG. 2 whereupon it can be used as a conventional bulldozer blade. In this generally upright position, lower edge 88 normally is partially embedded in the ground as the blade is pushed forwardly by the tractor 11. A digging and scooping action then takes place and the blade 30 is used in much the same manner as the conventional bulldozer blade.

When tilted forwardly as shown in FIG. 3, the blade 30 can be used in the same manner as a scraper blade on a grading machine. This grading position of the blade 30 enables the machine 10 to function as a grader so that a road surface or the like can be leveled off without the lower edge 88 digging too deeply into the road surface. The hydraulic cylinder 62 is pressurized to maintain this grading position as it does the other three major operating positions of the blade but the pair of arms 72 also lend support the blade so that no undue stress is placed on the power means 60.

To pick-up and carry a load of earth or the like, the blade 30 is driven into the earth while in the digging (FIG. 2) position. The power means 60 is then actuated to tilt or rock the blade rearwardly as shown in FIG. 4 whereupon the C-frame 15 is raised by means of the cylinders 22 to elevate the blade and the load supported thereon. The earth load can be transported from place to place by the machine and can be dumped from the elevated and rearwardly tilted blade 30 into a truck, for example, simply by pressurizing the appropriate end of the cylinder 62 to rock the blade to the forwardly tilted position shown in FIG. 3.

The blade 30 can also be used to clear out roots and the like and for this purpose, the moldboard extension 86 is removed to expose the teeth 80. The blade is then tilted to the FIG. 3 position whereupon the end of the teeth can be embedded in the ground to a depth which will dig out roots when the bulldozer 10 is moved forwardly.

It will be noted that the blade 30 can quickly and easily be removed from the C-frame 15. This is done by pulling out the pins 45 and 53 to release the blade from the tractor which is then driven in reverse to back the side members 16 out of the channels 50 and withdraw the front members 17 from the housing 44. The blade 30 can be picked up by reversing this procedure and generally this can be done by the tractor operator working without assistance.

The moldboard extension 86 can also be removed and replaced without difficulty. To remove the extension 86, the tractor operator merely loosens the locking pins 98 and then manipulates the blade to drop the extension on to the ground. Replacement is slightly more difficult but a skilled operator soon learns to use the blade 30 to jockey the extension into a position where the teeth 80 can be thrust into the holding sockets 90 and, when this is done, it is a simple matter to thread the locking pins 98 into the holes 95 which serves to lock the extension to the remainder of the blade.

From the foregoing, it will be seen I have provided a simple yet extremely effective bulldozer blade which will function equally as well as a scraper, a tooth digging implement, a conventional blade, or a loader bucket. The apparatus can readily be attached to or removed from a bulldozer C-frame and the power requirement of the device can be supplied by adding a few extra hose lines and a control valve to the hydraulic system of a conventional tractor.

I claim:

1. A multi-purpose blade for a bulldozer having a vertically swingable C-frame, said blade comprising a moldboard extending across a front end of the C-frame, pivot means securing the moldboard to the C-frame for rocking movement about a horizontal and transversely extending axis, said moldboard having a lower edge, a plurality of digging teeth extending downwardly from the lower edge, a moldboard extension detachably secured to the moldboard to cover the digging teeth, said moldboard extension having holding sockets to receive the digging teeth, locking means for detachably securing the moldboard extension to the moldboard, said locking means comprising a bar extending upwardly from the moldboard extension, said moldboard having a frame provided with a slot through which the bar projects, and a locking pin extending transversely through an opening in the bar to prevent withdrawal of said bar from the slot, and power means including a fluid cylinder and piston rod therefore for rocking the moldboard about the axis to a selected operating position, one such position being a forwardly tilted grading position, another being a generally upright digging position, and still another being a rearwardly tilted load-carrying position.

2. A multi-purpose blade as claimed in claim, 1 and including stop means for limiting rocking movement of the moldboard beyond the forwardly tilted grading position and the rearwardly tilted load-carrying position.

3. A multi-purpose blade as claimed in claim, 1 in which said pivot means and said power means are mounted on C-frame supported members, and a removable pin securing each of the members to the C-frame.

* * * * *